Oct. 28, 1969

F. J. STRICKER 3,475,079

MOVABLY SUPPORTED DISPERSION VIEWER

Filed June 9, 1966

INVENTOR.
FELIX J. STRICKER

BY
Hugh A. Kirk
ATTORNEY

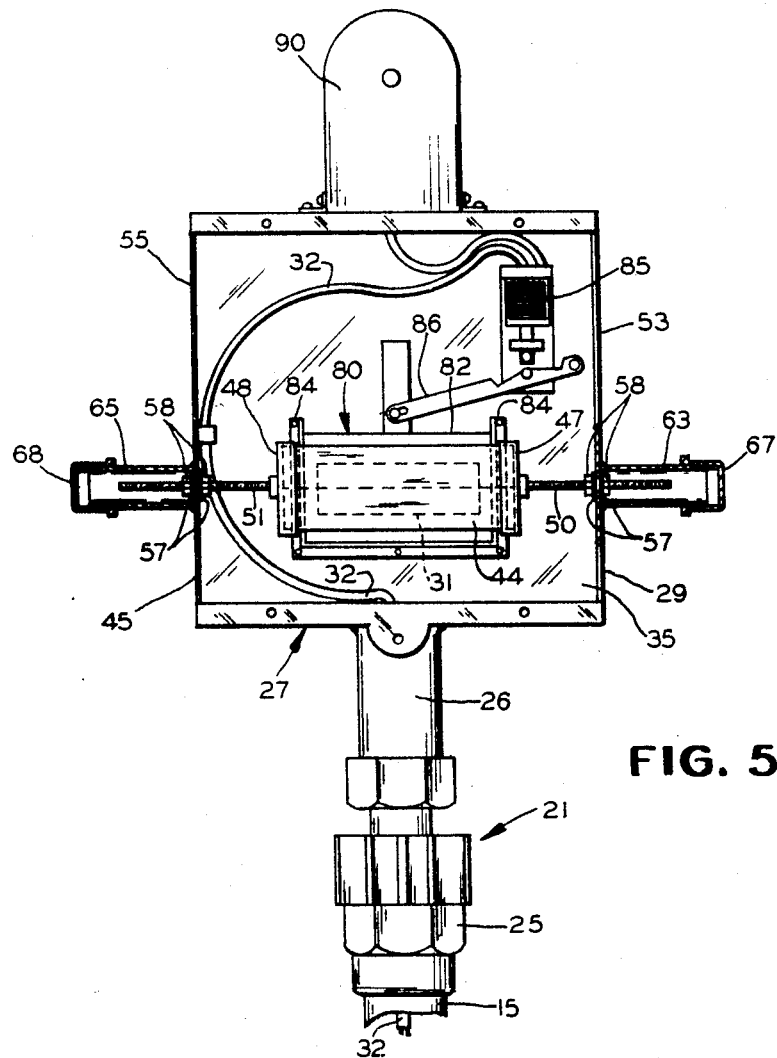
FIG. 5
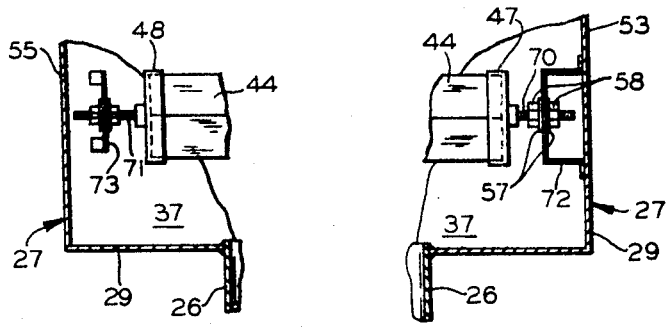
FIG. 6  FIG. 7
INVENTOR.
FELIX J. STRICKER
BY 
ATTORNEY

United States Patent Office 3,475,079
Patented Oct. 28, 1969

3,475,079
MOVABLY SUPPORTED DISPERSION VIEWER
Felix J. Stricker, R.F.D. 1, Helena, Ohio 43435
Filed June 9, 1966, Ser. No. 556,326
Int. Cl. G02b 7/18
U.S. Cl. 350—168                         1 Claim

ABSTRACT OF THE DISCLOSURE

This invention relates to a mounted amusement viewer. More particularly, it deals with such a device having a viewing system which may be obliquely and non-obliquely oriented with respect to a line of sight to vary the appearance of a viewed object or scene. The viewing system includes an optical element, such as a prism or grating, which may be adjustably mounted between and in line with shielded windowed apertures located on opposite sides of the box. The viewing system may be contained in a weatherproof encasement or box mounted on a support by means of a swivel joint which permits rotation about a vertical axis and tilting from the vertical axis. A coin operated shutter system may also be included in the viewing system to permit viewing for only limited periods of time.

---

The object of this invention is to produce a viewer which causes a chromatic aberration such as changing the appearance of a colorless or colored scene to a scene with a different coloration or with a full spectrum of visible colors, as well as varying the viewed width of the spectral lines.

It is another object to produce a viewer which varies the viewed width of the spectral lines.

The above mentioned and other features and objects of this invention and the manner of attaining them will become more apparent and the invention itself will be understood best by reference to the following description of embodiments of this invention taken in conjunction with the accompanying drawings, wherein:

FIG. 5 is an enlarged illustration of the viewing side of the device shown in FIG. 2 with its cover plate removed to show the optical element, its mounting means, and the shutter operating means; and FIGS. 6 and 7 are views similar to FIG. 5 with parts broken away and showing the other side of ends of the optical element and other means for mounting for the optical element.

Figure 1:
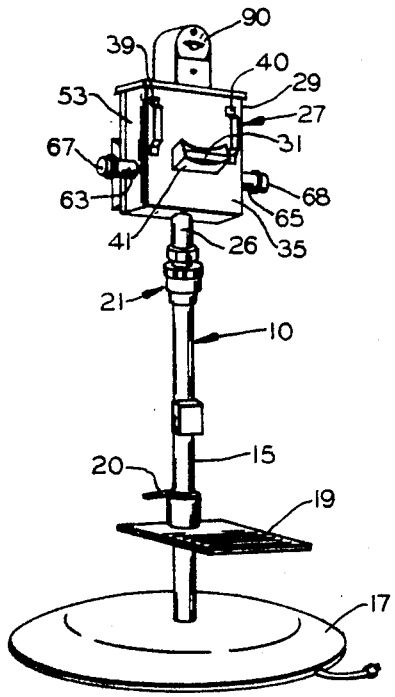
FIG. 1 is a perspective illustration of the viewer's side of a pedestal mounted coin operated viewing device according to one embodiment of this invention.

FIG. 1 shows an amusement viewing device 10 according to this invention with a support such as vertical post or column 15 mounted upon a relatively heavy base 17 which may be made of cast concrete, cast iron or the like to provide stability. However, the support column 15 may be mounted other than vertically and even may be suspended from an overhead support without departing from the scope of this invention. The post 15 may have a raised platform 19 adjustably clamped thereto such as by a screw or cam clamp means 20 a short distance above the base to facilitate operation of the viewer by children.

Figure 3:
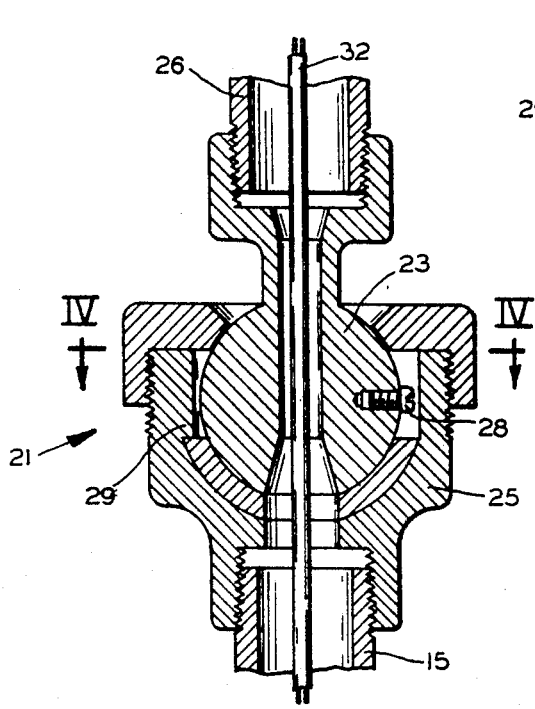
FIG. 3 is an enlarged vertical section of the ball and socket swivel mounting for the viewing device shown in FIGS. 1 and 2.
Figure 4:
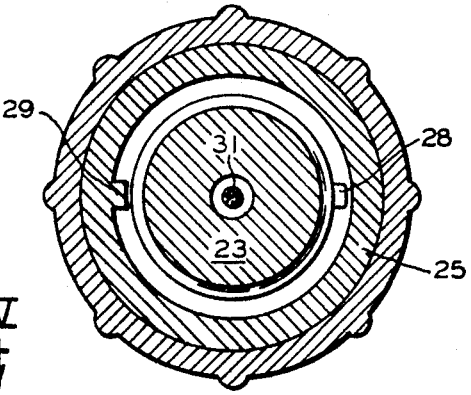
FIG. 4 is a horizontal section taken along line IV—IV of FIG. 3 showing the stop means for preventing complete rotation of the swivel mounting.

A flexible or frictional journal joint 21 such as one comprising a ball 23 and a socket 25 (see FIGS. 3 and 4) is used to connect the stem 26 on the body 27 of the viewer to the support column 15. Thus the viewer body 27 may be tilted obliquely from and rotated about an axis. The ball 23 and socket 25 may be hollow and may have cooperating stop means 28 and 29, respectively, for limiting the rotation of the viewer body 27 to a single revolution or less in order to avoid excessive twisting or flexing when an electrical conductor or wire 32 is required to extend up from the base 17 to the viewer body 27 through the interior of the post 15 and joint 21 for operation of a mechanism, such as a timer and/or shutter, in the viewer body 27.

Figure 2:
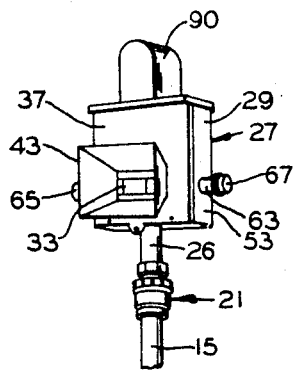
FIG. 2 is a perspective view of the opposite or viewing side of only the viewing device and its swivel mounting shown in FIG. 1.

The body 27 of the viewer may include a weatherproof enclosure such as a rectangular metal box 29 having windowed apertures 31 and 33 (see FIGS. 1 and 2), respectively, in its front 35 and back 37 panels. A pair of handles 39 and 40 also may be attached to the front side or panel 35 to facilitate the tilting and/or rotating of the viewer body 27. The side of the viewer box 29 facing the observer, denoted as the front side or panel 35, may have an external light shield 41 attached around the aperture 31, which shield 41 may comprise four connected flat sides angularly disposed with respect to the front panel and directed towards the optical element, such as one of the sides of a prism 44 contained within the body 27. Another external shield 43 for governing the light admitted to the optical element may be attached around the aperture 33 in the back panel 37, which shield 43 may have a hollow frusto pyramidal form converging toward the aperture and optical element behind it. The back panel 37, or one of the other panels of the box 29, may be removably attached to the box 29 to provide access to components of the viewing system contained within the viewer box 29.

One of the internal components is an optical element 44 which may be a grating, or may be a prism made of transparent glass or plastic, or the like, having a relatively high refractive index and having a triangular lateral cross-section and a size relative to that of the aperture 31 or 33. This optical element 44 may be adjustably mounted between the two windowed apertures 31 and 33 with its longitudinal axis parallel to the bottom of the viewer box 29. If the optical element 44 is a prism as shown, it preferably is oriented so that one of its sides faces the rear panel 37 and the other two sides face the front panel 35, with two or all three of its sides angularly disposed with respect to these panels 35 and 37. For this purpose a mounting means 45 for the optical element 44 may comprise cushioned end caps 47 and 48 for nesting each end of the optical element or prism 44. Each cap 47 and 48 may have an attached threaded rod or trunnion means 50 and 51 extending outwardly therefrom through a hole in its respective side panel 53 or 55 of the viewer box 29 which holes have a larger diameter than the rod 50 or 51 to permit substantial lateral movement of these rods therein. The rods 50 or 51 may be provided with washers 57 and nuts 58 disposed on each side of the respective panels 53 or 55 to adjustably position and lock the optical elements 44 in place. Thus the axial alignment, rotational position and longitudinal position of the optical element 44 may be adjusted to achieve the most desirable spectral colorations and results. The external ends of the threaded rods 50 or 51 may be encased in capped tubes 63 or 65 attached to the side panel 53 or 55 adjacent their respective holes, which tubes may function as handles 67 or 68 for tilting and rotating the body 27 of the viewer. FIGS. 6 and 7 show, respectively, shorter threaded rods 70 and 71 attached to the caps 47 and 48, which are adjustably mounted in holes in brackets 72 and 73 attached respectively to the end panels 53 and back panel 37, as other ways in which the optical element 44 may be mounted and inside the box 29.

A timer operated shutter system 80 (see FIG. 5) may be provided to limit the duration of a viewing to a specified period of time. The shutter system 80 may include a shutter 82 such as a metal plate slidably contained in channels 84 on the inside of the front panel 35 adjacent its windowed aperture 31. A motor means, such as an electrical solenoid 85 connected to electrical power conductor 32, may operate a lever means 86 connected to the shutter 82 to move the shutter 82 away from the aperture and expose the optical element 44 for viewing during the time the motor means 85 is energized. A coin operated timer switch 90 may be attached to the top of the viewer box 29 and also connected to the electrical power conductor 31 and solenoid 85 for controlling the specified period of time. Batteries, however, may be placed in the box 29, for operation of the solenoid 85 and timer 90, thereby eliminating the wire 31 through the post 15 and joint 21. Also instead of the electrical control for the shutter 82, a mechanical or spring timer and shutter operating motor means may be provided, without departing from the scope of this invention.

While there is described above the principles of this invention in connection with specific apparatus, it is to be clearly understood that this description is made only by way of example and not as a limitation to the scope of this invention.

What is claimed is:
1. A coin operated prismatic viewer comprising:
 (a) a transparent light refracting triangular prism having a length greater than its thickness and being long enough for a viewer to look through its side with both eyes at the same time,
 (b) a pair of cushion means for supporting the ends of said prism,
 (c) normally horizontal trunnion means extending outwardly longitudinally from said cushion means,
 (d) an opaque weatherproof housing for said prism, said housing having aligned opposed windows on opposite sides of said prism,
 (e) means inside said housing for mounting said prism by said trunnion means including means for adjusting and locking the angular position of said prism about the axis of said trunnion means,
 (f) opaque shield means around said windows for blocking light not substantially in alignment with said windows and prism,
 (g) movable shutter means in said housing for blocking and unblocking the light passing through said windows and prism,
 (h) means connected to said housing for guiding the movement of said shutter means into and out of its light blocking position,
 (i) lever means mounted in said housing and connected to said shutter means for controlling the movement of said shutter means,
 (j) coin operated means connected to said housing for operating said lever means to move said shutter means out of its light blocking position,
 (k) timer means connected to said housing and operated by said coin operated means for operating said lever means to move said shutter means into its light blocking position a predetermined time after said shutter means is moved out of its light blocking position,
 (l) pedestal means having a weighted base for supporting said housing including a first friction journal means for permitting rotation of said housing about a vetrical axis, and a second friction journal means for permitting limited rotation of said housing about a horizontal axis,
 (m) two horizontally spaced handle means on said housing for moving said housing in said friction journal means, and
 (n) an adjustable platform connected to said pedestal means above said base.

References Cited
UNITED STATES PATENTS

| | | | |
|---|---|---|---|
| 640,938 | 1/1900 | Patterson | 194—95 |
| 645,771 | 3/1900 | Weise | 194—95 |
| 664,343 | 12/1900 | Wheeler | 194—95 |
| 1,434,845 | 11/1922 | Richardson | 194—95 |
| 1,517,731 | 12/1924 | Johnson | 194—95 |
| 2,594,698 | 4/1952 | Thomas | 350—287 |

FOREIGN PATENTS
629,098  10/1961  Canada.

DAVID SCHONBERG, Primary Examiner
RONALD J. STERN, Assistant Examiner

U.S. Cl. X.R.
194—12, 95; 350—82, 287